(12) United States Patent
Taniguchi

(10) Patent No.: US 9,561,822 B2
(45) Date of Patent: Feb. 7, 2017

(54) IN-LANE DRIVE ASSIST DEVICE

(71) Applicant: Nissan Motor Co., Ltd., Yokohama-shi, Kanagawa (JP)

(72) Inventor: Hiroki Taniguchi, Atsugi (JP)

(73) Assignee: NIssan Motor Co., Ltd., Yokohama (JP)

( * ) Notice: Subject to any disclaimer, the term of this patent is extended or adjusted under 35 U.S.C. 154(b) by 0 days.

(21) Appl. No.: 14/758,256

(22) PCT Filed: Jan. 7, 2014

(86) PCT No.: PCT/JP2014/050061
§ 371 (c)(1),
(2) Date: Jun. 29, 2015

(87) PCT Pub. No.: WO2014/109307
PCT Pub. Date: Jul. 17, 2014

(65) Prior Publication Data
US 2015/0344068 A1    Dec. 3, 2015

(30) Foreign Application Priority Data

Jan. 10, 2013    (JP) .................................. 2013-002377

(51) Int. Cl.
*B62D 15/02*    (2006.01)
*B62D 6/00*    (2006.01)

(52) U.S. Cl.
CPC ............. *B62D 15/025* (2013.01); *B62D 6/003* (2013.01); *B62D 6/008* (2013.01)

(58) Field of Classification Search
CPC ..... B62D 5/0457; B62D 5/046; B62D 5/0463; B62D 5/0466; B62D 6/003; B62D 6/008; B62D 15/025; B62D 15/0255; B60W 30/12
See application file for complete search history.

(56) References Cited

U.S. PATENT DOCUMENTS 5,251,135 A    10/1993   Serizawa et al.
6,079,513 A *   6/2000   Nishizaki ............... B62D 5/006
                                                           180/402

(Continued)

FOREIGN PATENT DOCUMENTS

CN       102717825 A    10/2012
JP        4-133860 A     5/1992

(Continued)

OTHER PUBLICATIONS

JPO machine translation of JP 2000-198458 (original JP document published Jul. 18, 2000).*

*Primary Examiner* — Behrang Badii
*Assistant Examiner* — David Testardi
(74) *Attorney, Agent, or Firm* — Global IP Counselors, LLP

(57) ABSTRACT

An in-lane drive assist device controls a turning amount of a turning unit that is mechanically detached from a steering unit-based on a steering amount of a steering unit when a lane deviation is determined to be absent. The in-lane drive assist device controls the turning amount based on a drive assist turning amount for generating a yaw moment to return a vehicle into a lane while the steering reaction force applied to the steering unit is controlled based on a target steering reaction force corresponding to a steering reaction force characteristic that is set so that a self-aligning torque increases as the steering reaction force increases when a lane deviation is determined to be present, and the steering reaction force characteristic is offset in a direction in which an absolute value of the steering reaction force increases as a lateral position of the vehicle approaches a white line.

10 Claims, 11 Drawing Sheets

(56) References Cited

U.S. PATENT DOCUMENTS

| | | | |
|---|---|---|---|
| 2003/0060936 A1* | 3/2003 | Yamamura | G08G 1/167 701/1 |
| 2003/0150666 A1* | 8/2003 | Ogawa | B62D 5/008 180/443 |
| 2004/0039507 A1* | 2/2004 | Yao | B62D 6/008 701/41 |
| 2004/0059482 A1* | 3/2004 | Hijikata | B62D 15/02 701/36 |
| 2005/0021204 A1* | 1/2005 | Kudo | B62D 15/025 701/36 |
| 2006/0042860 A1* | 3/2006 | Endo | B62D 6/008 180/412 |
| 2008/0142293 A1* | 6/2008 | Goto | B62D 6/008 180/446 |
| 2011/0015850 A1* | 1/2011 | Tange | B60W 30/12 701/116 |
| 2013/0166150 A1* | 6/2013 | Han | B60W 10/18 701/42 |

FOREIGN PATENT DOCUMENTS

| | | | |
|---|---|---|---|
| JP | 9-221052 A | | 8/1997 |
| JP | 2000-108915 A | | 4/2000 |
| JP | 2000198458 A | * | 7/2000 |
| JP | 2001187582 A | * | 7/2001 |
| JP | 2003320951 A | * | 11/2003 |
| JP | 2005-306200 A | | 11/2005 |
| JP | 2006-206032 A | | 8/2006 |
| JP | 2006-248304 A | | 9/2006 |
| JP | 2009-248685 A | | 10/2009 |
| JP | 2011255817 A | * | 12/2011 |

* cited by examiner

US 9,561,822 B2

IN-LANE DRIVE ASSIST DEVICE

CROSS-REFERENCE TO RELATED APPLICATIONS

This application is a U.S. National stage application of International Application No. PCT/JP2014/050061, filed Jan. 7, 2014, which claims priority to Japanese Patent Application No. 2013-002377 filed in Japan on Jan. 10, 2013.

BACKGROUND

Field of the Invention

The present invention relates to an in-lane drive assist device.

Background Information

Japanese Laid-Open Patent Application No. 2006-248304 discloses a technique that determines the presence/absence of lane deviation with respect to a traveling lane, and, when a presence of lane deviation is determined, an assisting force of an electric power steering is increased in a direction to return the vehicle into the traveling lane.

SUMMARY

In the prior art described above, there is a problem that a turning angle obtained by increasing the assisting force fluctuates due to the steering retention force of the driver, resulting in a variation in the vehicle behavior and not being able to obtain the intended vehicle behavior. The object of the present invention is to provide an in-lane drive assist device that is capable of obtaining the intended vehicle behavior regardless of the steering retention force of the driver.

In the present invention, upon controlling the turning amount of the turning unit that is mechanically detached from the steering unit, the turning amount of the turning unit is controlled based on the steering amount of the steering unit when a lane deviation is determined to be absent, and the turning amount is controlled based on a drive assist turning amount for generating a yaw moment in a direction to return the vehicle into the lane while the steering reaction force is controlled based on the turning amount without reflecting the drive assist turning amount on the steering reaction force that is applied to the steering unit, when a lane deviation is determined to be present.

Thus, since the turning angle that is obtained by the drive assist turning amount is not affected by the steering retention force of the driver, the intended vehicle behavior can be obtained regardless of the steering retention force of the driver.

BRIEF DESCRIPTION OF THE DRAWINGS

Referring now to the attached drawings which form a part of this original disclosure.

DETAILED DESCRIPTION OF THE EMBODIMENTS

Figure 1:
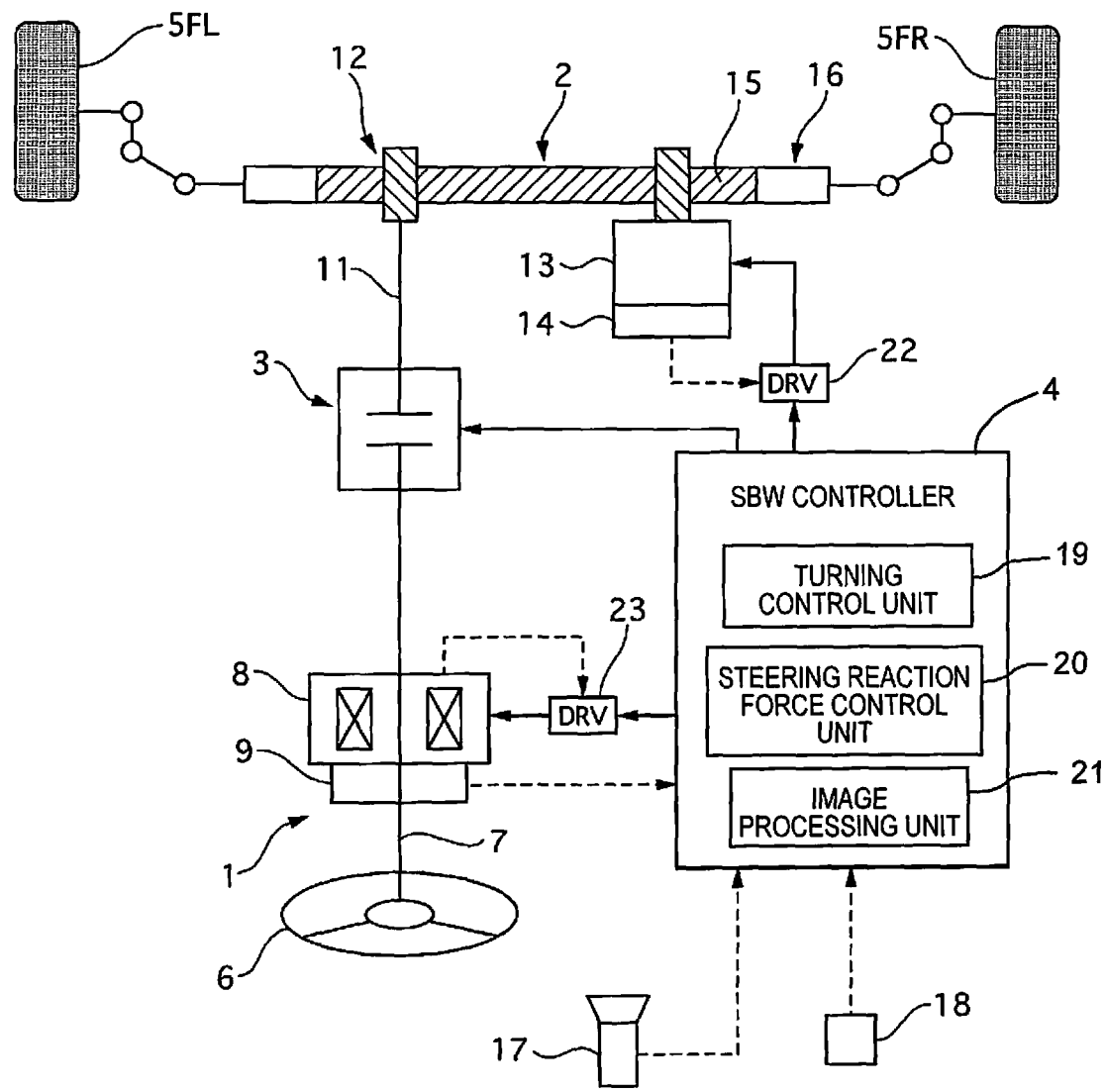
FIG. 1 is a system illustrating the steering system of a vehicle of the first embodiment.

FIG. 1 is a system view illustrating a steering system of a vehicle of the first embodiment.

The steering device of the first embodiment is mainly configured by a steering unit 1, a turning unit 2, a backup clutch 3, and an SBW controller 4, and the device employs a steer-by-wire (SBW) system in which the steering unit 1, which receives steering input from a driver and the turning unit 2, which turns a left and a right front wheel (the turning wheels) 5FL, 5FR are mechanically detached.

The steering unit 1 is provided with a steering wheel 6, a column shaft 7, a reaction force motor 8, and a steering angle sensor 9. The column shaft 7 rotates integrally with the steering wheel 6. The reaction force motor 8 is, for example, a brushless motor, and a coaxial motor in which the output shaft is coaxial with the column shaft 7 outputs a steering reaction force torque to the column shaft 7 in response to a command from the SBW controller 4. The steering angle sensor 9 detects the absolute rotation angle of the column shaft 7, that is, the steering angle of the steering wheel 6.

The turning unit 2 is provided with a pinion shaft 11, a steering gear 12, a turning motor 13, and a turning angle sensor 14. The steering gear 12 is a rack-and-pinion-type steering gear, which turns the front wheels 5L, 5R in response to the rotation of the pinion shaft 11. The turning motor 13 is, for example, a brushless motor, in which the output shaft is connected to a rack gear 15 via an unillustrated decelerator, and this motor outputs a turning torque for turning the front wheel 5 to a rack 16 in response to a command from the SBW controller 4. The turning angle sensor 14 detects the absolute rotation angle of the turning motor 13. Since there is an always uniquely determined correlation between the rotation angle of the turning motor 13 and the turning angle of the front wheel 5, the turning angle of the front wheel 5 can be detected based on the rotation angle of the turning motor 13. Herein below, unless specifically described, the turning angle of the front wheel 5 shall be that which is calculated based on the rotation angle of the turning motor 13. The backup clutch 3 is provided between the column shaft 7 of the steering unit 1 and the pinion shaft 11 of the turning unit 2, and the steering unit 1 and the turning unit 2 are mechanically detached by a release; the steering unit 1 and the turning unit 2 are mechanically connected by the fastening thereof.

In addition to the steering angle sensor 9 and the turning angle sensor 14 described above, the vehicle speed (the vehicle body speed) detected by an image of the traveling path in front of the host vehicle captured by a camera 17 and a vehicle speed sensor 18 are input into the SBW controller 4. The SBW controller 4 comprises a turn control unit 19 for controlling the turning angle of the front wheels 5FL, 5FR, a steering reaction force control unit 20 for controlling the steering reaction force torque applied to the column shaft 7, and an image processing unit 21. The turn control unit 19 generates a command turning angle based on each piece of input information and outputs the generated command turning angle to a current driver 22. The current driver 22 controls the command current to the turning motor 13 by an angle feedback for matching the actual turning angle detected by the turning angle sensor 14 with the command turning angle. The steering reaction force control unit 20 generates a command steering reaction force torque based on each piece of input information and outputs the generated command steering reaction force torque to a current driver 23. The current driver 23 controls the command current to the reaction force motor 8 by a torque feedback for matching the actual steering reaction force torque that is inferred from the current value of the reaction force motor 8 with the command steering reaction force torque. The image processing unit 21 recognizes a traveling lane of left and right white lines (the traveling path dividing lines) by image processing, such as by edge extraction from an image of a traveling path in front of a host vehicle captured by the camera 17. In addition, when the SBW system fails, the SBW controller 4 fastens the backup clutch 3 and mechanically couples the steering unit 1 and the turning unit 2, allowing the rack 16 to move in the axial direction by steering the steering wheel 6. At this time, a control corresponding to an electric power steering system for assisting the steering force of the driver by an assist torque of the turning motor 13 can be executed. The SBW system described above may be a redundant system provided with a plurality of each sensor, each controller, and each motor. Additionally, the turn control unit 19 and the steering reaction force control unit 20 may be separate bodies.

In the first embodiment, corrective steering reduction control is executed with the aim to reduce the corrective steering amount of the driver. The corrective steering reduction control aims to improve the safety of a vehicle with respect to the steering input from the driver and performs two reaction force offset controls.

1. Reaction Force Offset Control Corresponding to the Lateral Position

The steering reaction force characteristic corresponding to the self-aligning torque is offset in a direction in which the absolute value of the steering reaction force becomes larger in accordance with the lateral position in order to suppress the sign of the steering torque from being inverted when a driver performs corrective steering that straddles the steering angle neutral position.

2. Reaction Offset Control Corresponding to the Deviation Margin Time.

The steering reaction force characteristic corresponding to the self-aligning torque is offset in a direction in which the absolute value of the steering reaction force becomes larger in accordance with the deviation margin time (the time required to reach the white line) in order to suppress the sign of the steering torque from being inverted when a driver performs corrective steering that straddles the steering angle neutral position.

Turn Control Unit

Figure 2:
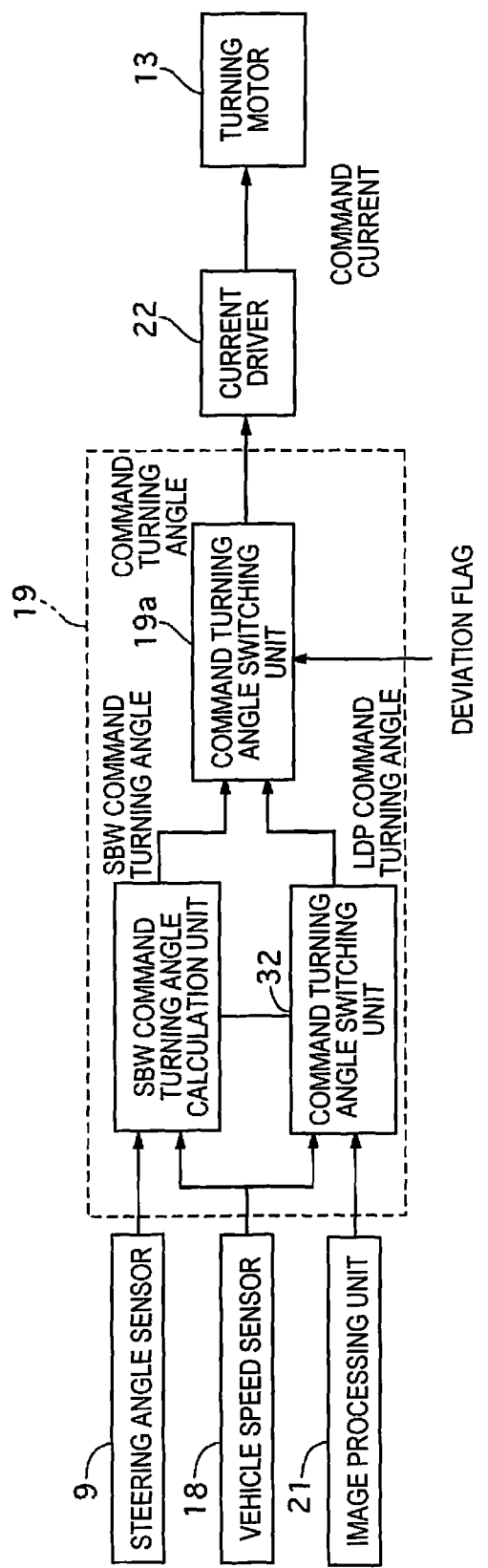
FIG. 2 is a control block view of the turn control unit 19.

FIG. 2 is a control block view of the turn control unit 19. The SBW command turning angle calculation unit 31 calculates an SBW command turning angle based on the steering angle and the vehicle speed. The LDP (Lane Departure Prevention) command turning angle calculation unit 32 calculates an LDP command turning angle for generating a yaw moment in a direction to return a vehicle into a lane based on vehicle speed and white line information, when a lane deviation is determined to be present. The details of the LDP command turning angle calculation unit 32 will be described below. The command turning angle switching unit 19a outputs an SBW command turning angle to a current driver 22 as the final command turning angle when a deviation flag outputted from the deviation determination unit 32d described below has been reset (=0), and outputs the LDP command turning angle to the current driver 22 as the final command turning angle when the deviation flag has been set (=1).

Steering Reaction Force Control Unit

Figure 3:
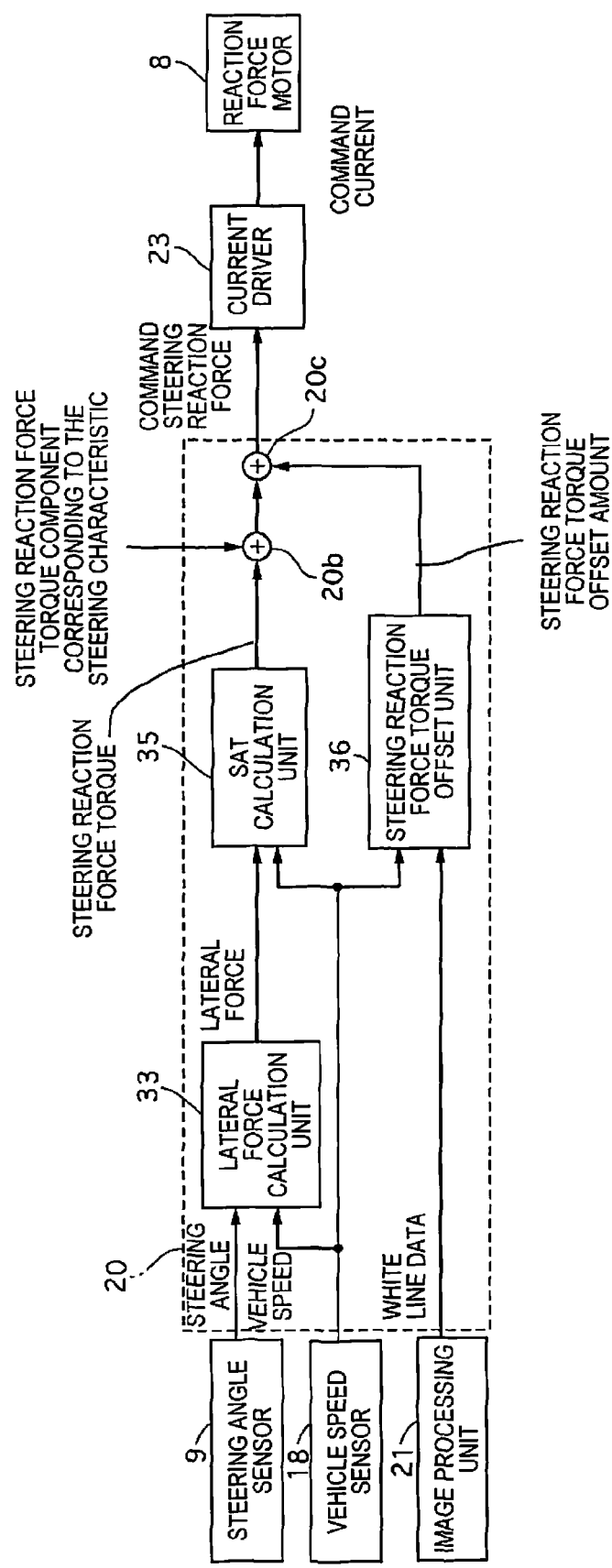
FIG. 3 is a control block view of a steering reaction force control unit 20 of the first embodiment.

FIG. 3 is a control block view of a steering reaction force control unit 20. The lateral force calculation unit 33 calculates a tire lateral force by referencing a steering angle-lateral force conversion map representing the relationship between the steering angle and the tire lateral force per vehicle speed in a conventional steering device, which have been obtained by experimentation or other means beforehand, based on the steering angle and the vehicle speed. The steering angle-lateral force conversion map has a characteristic in which the tire lateral force increases as the steering angle increases; the change amount of the tire lateral force with respect to the change amount of the steering angle is larger when the steering angle is small, as compared to when large; and the tire lateral force becomes smaller as the vehicle speed increases. The self-aligning torque (SAT) calculation unit 35 calculates a steering reaction force torque that is generated by the tire lateral force by referencing a lateral force-steering reaction force torque conversion map, representing the relationship between the tire lateral force and the steering reaction force torque in a conventional steering device obtained by experimentation or other means beforehand, based on the vehicle speed and the tire lateral force. The tire lateral force-steering reaction force torque conversion map has a characteristic in which the steering reaction force torque is larger as the tire lateral force increases; the change amount of the steering reaction force torque with respect to the change amount of the tire lateral force is larger when the tire lateral force is small, as compared to when large; and the steering reaction force torque becomes smaller as the vehicle speed increases. This characteristic simulates a reaction force that is generated in the steering wheel by the self-aligning torque of wheels trying to return to a straight state, which is generated by the road surface reaction force in a conventional steering device.

The adder 20b adds a steering reaction force torque component (a spring item, a viscous item, an inertia item) corresponding to the steering reaction force torque and the steering characteristic. The spring item is a component that is proportional to the steering angle and is calculated by multiplying a predetermined gain and the steering angle. The viscous item is a component proportional to the steering angular velocity and is calculated by multiplying a predetermined gain and the steering angular velocity. The inertia item is a component that is proportional to the steering angular acceleration and is calculated by multiplying a predetermined gain and the steering angular acceleration. The steering reaction force torque offset unit 36 calculates a steering reaction force torque offset amount for offsetting the steering reaction force characteristic in a reaction force offset control corresponding to the lateral position or the deviation margin time, based on the vehicle speed and the image of a traveling path in front of the host vehicle. The details of the steering reaction force torque offset unit 36 will be described below. The adder 20c outputs a value obtained by adding the steering reaction force torque, after adding a steering reaction force torque component corresponding to the steering characteristic, and the steering torque offset amount to the current driver 23 as the final command steering reaction force torque.

LDP Command Turning Angle Calculation Unit

Figure 4:
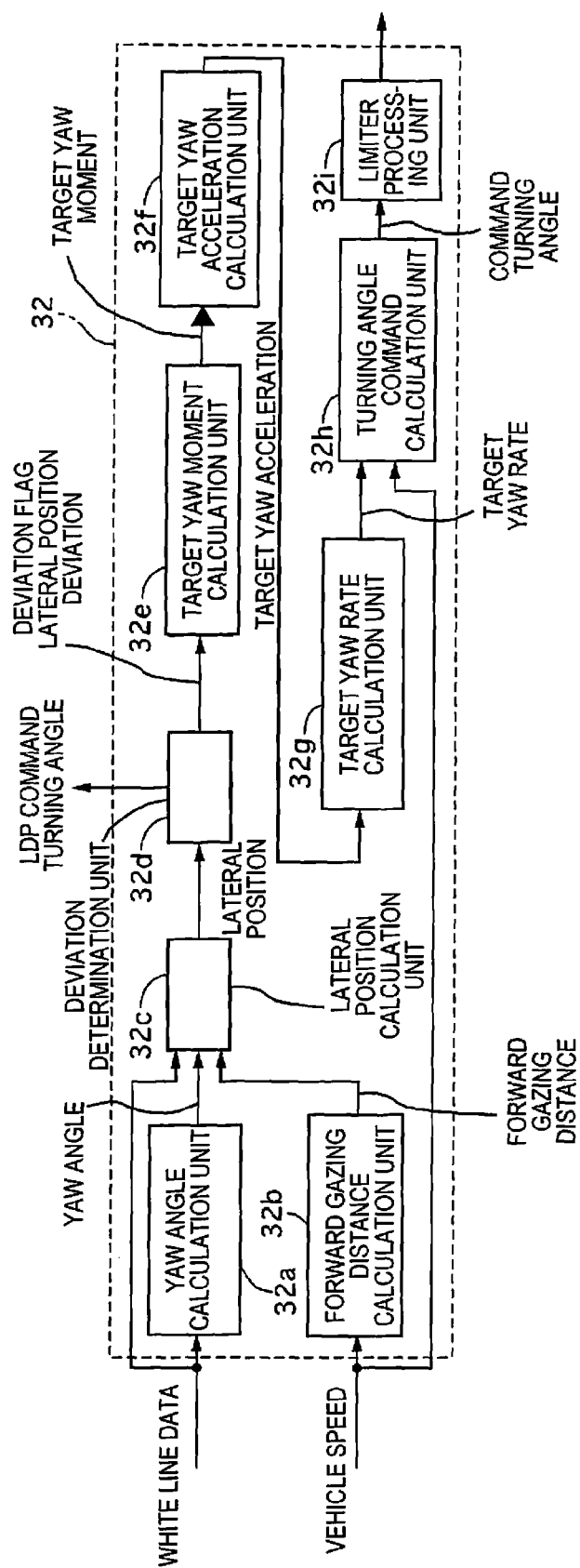
FIG. 4 is a control block view of an LDP command turning angle calculation unit 32.

FIG. 4 is a control block view of an LDP command turning angle calculation unit 32. The yaw angle calculation unit 32a calculates the yaw angle, which is an angle between the white line that intersects with the host vehicle traveling direction (target white line) and the host vehicle traveling direction. The forward gazing distance calculation unit 32b calculates a forward gazing distance, which is the forward distance at which a vehicle is predicted to be after a certain headway time, by multiplying a predetermined headway time and the vehicle speed. The lateral position calculation unit 32c calculates the lateral position at the forward gazing distance, by calculating the movement amount of the lateral position for moving to the forward gazing distance by multiplying the forward gazing distance and the yaw angle, and adding the result and the current lateral position (distance to the target white line). The deviation determination unit 32d calculates the lateral position deviation at the forward gazing distance by subtracting a control threshold value that is set beforehand from the absolute value of the lateral position at the forward gazing distance, and outputs the calculated lateral position deviation. Also, the deviation determination unit determines that "lane deviation is absent" when the lateral position deviation is less than zero (<0) and resets the deviation flag (=0), and determines that "lane deviation is present" when the lateral position deviation is equal to or greater than zero (≥0) and sets a deviation flag (=1). If a turn signal is flashing in the target white line direction, a lane change is taking place; thus, the deviation determination unit determines that "lane deviation is absent" and resets the deviation flag, even if the lateral position deviation is equal to or greater than zero.

The target yaw moment calculation unit 32e calculates a target yaw moment M* by referencing the following formula.

$$M^* = (2 \times I \times \Delta Y)/(L \times T^2)$$

Where $I$ is the yaw inertia moment, $\Delta Y$ is the lateral position deviation at the forward gazing distance, $L$ is the forward gazing distance, and $T$ is the headway time.

The target yaw acceleration calculation unit 32f calculates the target yaw acceleration by multiplying a yaw inertia moment coefficient and the target yaw moment.

The target yaw rate calculation unit 32g calculates a target yaw rate by multiplying the headway time and the target yaw acceleration. The turning angle command calculation unit 32h calculates an LDP command turning angle δ* by referencing the following formula.

$$\delta^* = (\phi^* \times \text{WHEEL BASE} \times (1 + (V/vCh)^2) \times 180)/(V \times M\_PI)$$

Where $\phi^*$ is the target yaw rate, WHEEL_BASE is the wheelbase, vCh is the characteristic velocity of the vehicle, V is the vehicle speed, and M_PI is a predetermined coefficient. The characteristic velocity of the vehicle vCh is a parameter in the well-known "Ackerman Equation," representing the self-steering characteristics of the vehicle.

The limiter processing unit 32i limits the upper limit of the change rate of the LDP command turning angle at a rate limit value and outputs the limited value to the command turning angle switching unit 19a. The rate limit value is set larger when the LDP command turning angle is increasing, as compared to when decreasing. Specifically, the rate limit value when increasing is set to be the maximum value that can be taken according to safety constraints, and the rate limit value when decreasing is limited to a value of a level with which the lateral acceleration (lateral G) does not rapidly change, and with which the vehicle will not be returned to the opposite lane due to the control continuing for a long time. Also, even when increasing, if the LDP command turning angle is equal to or greater than a predetermined angle, the rate limit value is set smaller than when the LDP command turning angle is less than the predetermined angle, so that the lateral G change at a point at which the increase turns to a decrease is reduced.

Steering Reaction Force Torque Offset Unit

Figure 5:
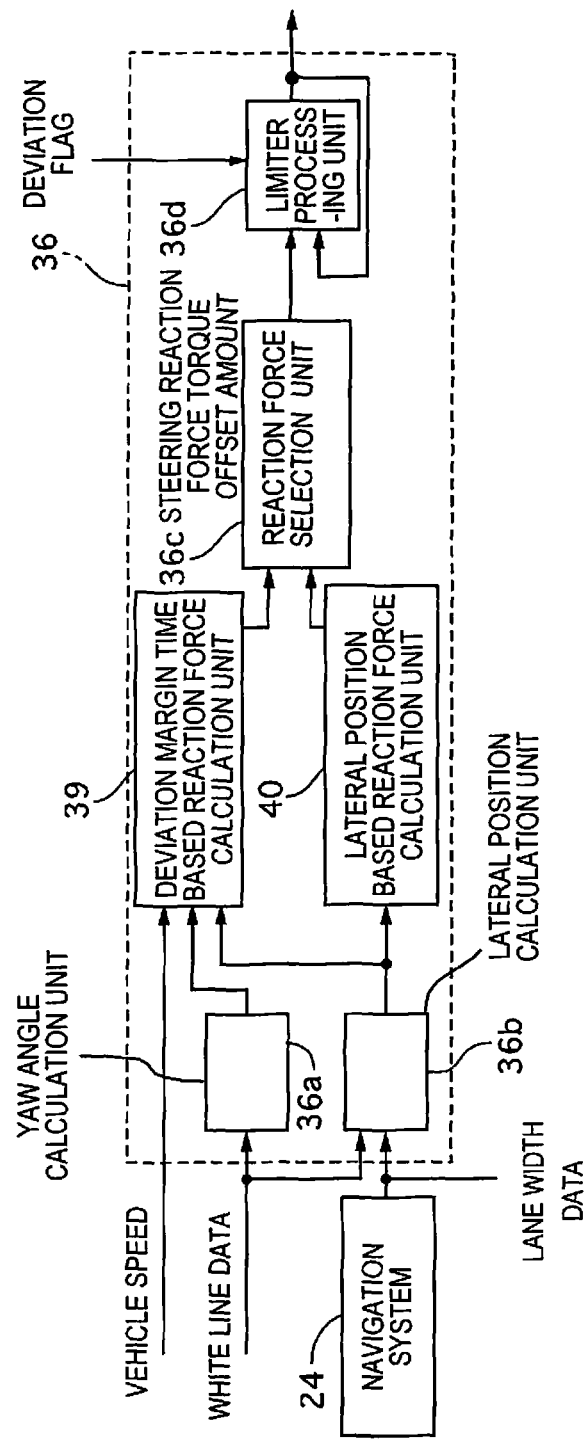
FIG. 5 is a control block view of a steering reaction force torque offset unit 36.

FIG. 5 is a control block view of the steering reaction force torque offset unit 36. A yaw angle calculation unit 36a calculates the yaw angle at the forward gazing point. Easily and precisely detecting the yaw angle is possible by calculating the yaw angle based on an image of the traveling path captured by the camera 17. A lateral position calculation unit 36b calculates each of the lateral positions with respect to the left and right white lines at the forward gazing point and the lateral position with respect to the left and right white lines at the current position. Here, when the host vehicle moves to an adjacent traveling lane beyond the white line, that is, when a lane change occurs, the lateral position calculation unit 36b replaces the lateral position with respect to the left and right white lines at the current position. That is, the lateral position with respect to the left white line before reaching the white line is set as the lateral position with respect to the right white line after reaching the white line, and the lateral position with respect to the right white line before reaching the white line is set as the lateral position with respect to the left white line after reaching the white line. When lane changing to a traveling lane with a different lane width, the lateral position is corrected by multiplying the value $W_2/W_1$, obtained by dividing the lane width $W_2$ of the traveling lane after the lane change by the lane width $W_1$ of the traveling lane before the lane change, to the replaced lateral position. Here, the lane width information of each traveling lane is acquired from a navigation system 24. A deviation margin time based reaction force calculation unit 39 calculates a reaction force corresponding to the deviation margin time based on the vehicle speed and the lateral position with respect to the left and right white lines at the forward gazing point. The details of the deviation margin time based reaction force calculation unit 39 will be described below. A lateral position based reaction force calculation unit 40 calculates the reaction force corresponding to the lateral position, based on the lateral position with respect to the left and right white lines at the current position. The details of the lateral position based reaction force calculation unit 40 will be described below. A reaction force selection unit 36c selects that with the larger absolute value from among the reaction force corresponding to the deviation margin time and the reaction force corresponding to the lateral position as the steering reaction force torque offset amount. A limiter processing unit 36d limits the maximum value and the upper limit of the change rate of the steering reaction force torque offset amount. For example, the maximum value is 2 Nm and the upper limit of the change rate is 10 Nm/s. Additionally, when a deviation flag outputted from the deviation determination unit 32d is set (=1), the limiter processing unit 36d holds the steering reaction force torque offset amount to be outputted to a value that was outputted immediately before the deviation flag was set, until the deviation flag is reset (=0). After the deviation flag is reset, the steering reaction force torque offset amount is returned to the calculated value; however, the steering reaction force torque offset amount is gradually changed to the calculated value at a predetermined change rate to suppress a rapid change in the steering reaction force.

Figure 6:
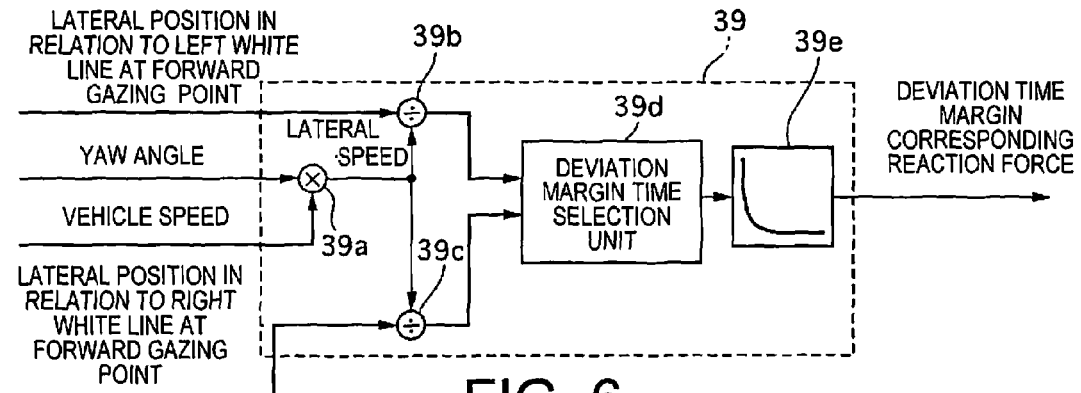
FIG. 6 is a control block view of a deviation margin time based reaction force calculation unit 39.

FIG. 6 is a control block view of a deviation margin time based reaction force calculation unit 39. A multiplier 39a determines the lateral speed of the vehicle by multiplying the vehicle speed and the yaw angle. A divider 39b determines the deviation margin time with respect to the left white line by dividing the lateral position with respect to the left white line at the forward gazing point by the lateral speed. A divider 39c determines the deviation margin time with respect to the right white line by dividing the lateral position with respect to the right white line at the forward gazing point by the lateral speed. A deviation margin time selection unit 39d selects the shorter of the deviation margin times with respect to the left and right white lines as the deviation margin time. A deviation margin time reaction force calculation unit 39e corresponding to the deviation margin time calculates the reaction force corresponding to the deviation margin time, based on the deviation margin time. The reaction force corresponding to the deviation margin time is inversely proportional to the deviation margin time (proportional to the inverse of the deviation margin time) and has the characteristic of becoming almost zero at three seconds or more.

Figure 7:
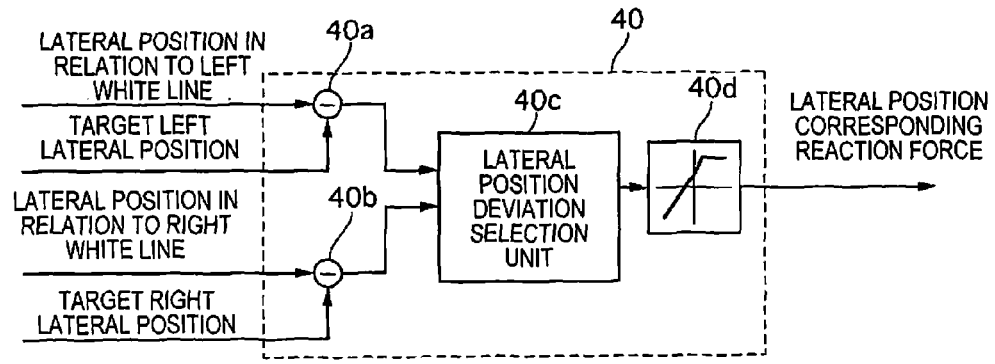
FIG. 7 is a control block view of a lateral position based reaction force calculation unit 40.

FIG. 7 is a control block view of a lateral position based reaction force calculation unit 40. A subtractor 40a determines the lateral position deviation with respect to the left lane by subtracting the lateral position with respect to the left lane from a target left lateral position that is set beforehand (for example, 90 cm). A subtractor 40b determines the lateral position deviation with respect to the right lane by subtracting the lateral position with respect to the right lane from a target right lateral position that is set beforehand (for example, 90 cm). A lateral position deviation selection unit 40c selects the larger of the lateral position deviations with respect to the left and right lanes as the lateral position deviation. A lateral position deviation based reaction force calculation unit 40d calculates the reaction force corresponding to the lateral position, based on the lateral position deviation. The reaction force corresponding to the lateral position shall have a characteristic of increasing as the lateral position deviation increases, and an upper limit is set thereon.

Figure 8:
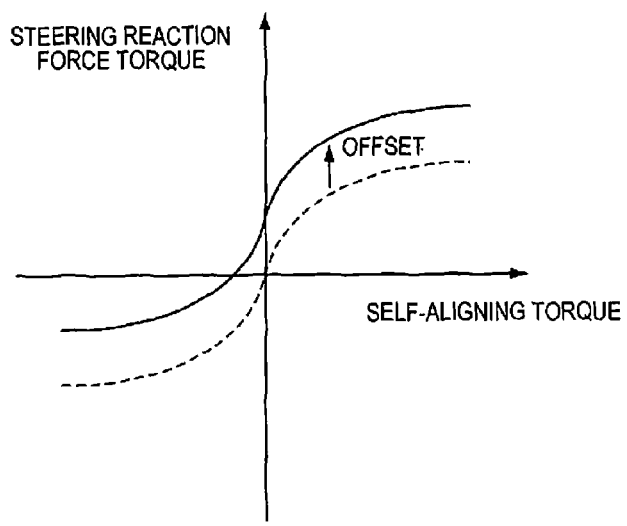
FIG. 8 is a view illustrating a state in which the steering reaction force characteristic, representing the steering reaction force torque corresponding to the self-aligning torque, is offset in a direction in which the absolute value of the steering reaction force torque becomes larger.

Next, the effects of the reaction force offset control corresponding to the lateral position are described. The reaction force offset control corresponding to the lateral position adds the reaction force corresponding to the lateral position to the steering reaction force torque as the steering reaction force torque offset amount. The steering reaction force characteristic representing the steering reaction force torque corresponding to the self-aligning torque is thereby offset in a direction in which the absolute value of the steering reaction force torque increases as the distance to the white line decreases, as illustrated in FIG. 8. FIG. 8 illustrates a case of being close to the right lane, and in the case of being close to the left lane the offset is in the opposite direction of FIG. 8.

Figure 9:
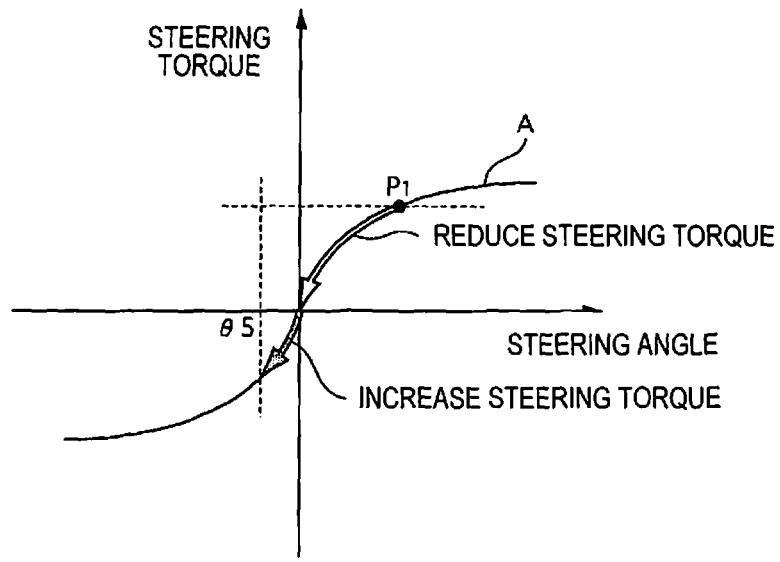
FIG. 9 is a characteristic view illustrating the relationship between the steering angle of the steering wheel and the steering torque of the driver.

Here, a case is considered in which the traveling position of the vehicle shifts to the right side due to the driver suddenly steering to the right, after which the driver returns the traveling position to the vicinity of the center of the traveling lane with corrective steering, in a conventional steering reaction force control. The steering angle and the steering torque when the driver conducts a sudden operation shall be the position of point $P_1$ on the characteristic A in FIG. 9. The characteristic A shall be a characteristic representing the relationship between the steering angle and the steering torque when setting a steering reaction force characteristic simulating a conventional steering device. Since turning the front wheel to the left is necessary in order to return the traveling position to the vicinity of the center of the traveling lane from this state, following return steering to the steering angle neutral position, the driver increases the steering from the steering angle neutral position and matches the steering wheel to a target angle $\theta_5$. At this time, in the conventional technology described above, the steering angle neutral position (the steering angle zero point) and the steering torque neutral position (the steering torque zero point) match, and decreasing the steering torque until the steering angle neutral position while increasing the steering torque after exceeding the steering angle neutral position is necessary. In other words, when conducting a correction steering straddling the steering angle neutral position, the sign of the steering torque is inverted and the direction in which the driver controls the force is switched, and since the change amount of the steering angle with respect to the change amount of the steering torque is significantly smaller in the vicinity of the steering torque neutral position compared to other steering angle regions, the steering load of the driver is large and it is difficult to control the steering wheel to the target angle $\theta_5$. Thus, there is the problem that the traveling position of the vehicle is more readily overshot, leading to an increase in the corrective steering amount.

Figure 10:
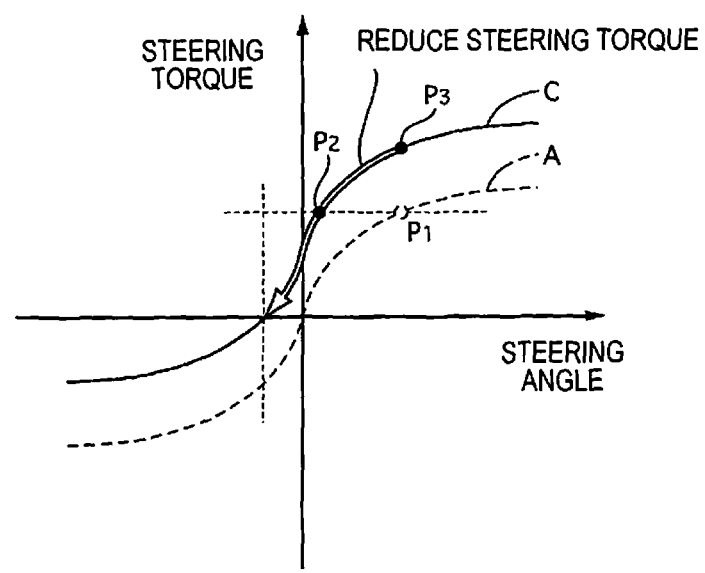
FIG. 10 is a view illustrating a state in which the characteristic illustrating the relationship between the steering angle of the steering wheel and the steering torque of the driver has been changed by offsetting the steering reaction force characteristic, representing the steering reaction force torque corresponding to the self-aligning torque, in a direction in which the absolute value of the steering reaction force torque becomes larger.

In contrast, in the reaction force offset control corresponding to the lateral position of the first embodiment, by offsetting the steering reaction force torque corresponding to the self-aligning torque more in a direction in which the absolute value of the steering reaction force torque increases as the distance to the white line decreases, the characteristic representing the relationship between the steering angle and the steering torque is offset in the direction in which the absolute value of the steering torque increases, as illustrated in FIG. 10, and characteristic A changes continuously to characteristic C, as the distance to the white line decreases. At this time, increasing the steering torque in order to maintain the steering angle is necessary; therefore, if the steering torque is constant, the steering wheel 6 gradually returns to the steering angle neutral position (point $P_1 \rightarrow$ point $P_2$), thereby suppressing the traveling position of the vehicle from shifting to the right side due to the driver suddenly steering. On the other hand, when the driver maintains the steering angle, the steering angle and the steering torque move from point $P_1$ to point $P_3$. When the driver conducts corrective steering from this state, since the steering torque neutral position is offset more to the steering increase side than the steering angle neutral position in characteristic C, the sign of the steering torque is not inverted before reaching the steering torque neutral position during the steering increase operation from the steering angle neutral position. Thus, the driver is able to control the turning angle of the front wheels 5L, 5R by only reducing the steering torque and stopping the rotation of the steering wheel 6 when the steering wheel 6 is turned to the target angle. That is, the reaction force offset control corresponding to the lateral position of the first embodiment is able to facilitate the corrective steering of the driver since the direction in which the driver controls the force is not readily switched. As a result, the traveling position of the vehicle is not readily overshot, and the corrective steering amount can be reduced.

Conventionally, a technology is known in which the object is to suppress the traveling position from shifting due to a sudden operation by the driver, by increasing the steering reaction force when approaching the white line; however, in the conventional technology, the steering wheel is simply made heavier when approaching the white line, and the steering torque neutral position in the steering reaction force characteristic always matches with the steering angle neutral position; therefore, the sign of the steering torque is inverted in the corrective steering that straddles the steering angle neutral position, and the steering load of the driver is not reduced. In other words, by offsetting the steering reaction force torque corresponding to the self-aligning torque more in a direction in which the absolute value of the steering reaction force torque increases as the distance to the white line decreases, realizing both the suppression of the shifting of the traveling position and a reduction in the steering load of the driver is possible.

Additionally, in the reaction force offset control corresponding to the lateral position of the first embodiment, the offset amount is configured to be greater as the distance to the white line decreases; as a result, the steering torque neutral position is offset to a position that is further separated from the steering angle neutral position as the distance to the white line decreases. When the driver conducts corrective steering to return the traveling position of the vehicle to the vicinity of the center of the traveling lane, increasing the steering increase operation amount from the steering angle neutral position as the white line comes closer is necessary. At this time, when the offset amount of the steering torque neutral position with respect to the steering angle neutral position is small, there is the possibility that the steering torque surpasses the neutral position and the sign of the steering torque is inverted before the steering wheel is turned to the target angle. Thus, suppressing the steering torque from surpassing the neutral position is possible by increasing the offset amount as the distance to the white line decreases.

In the reaction force offset control corresponding to the lateral position of the first embodiment, the lateral position calculation unit 36b switches the lateral position with respect to the left and right white lines at the current position when the host vehicle reaches the white line. The reaction force offset control corresponding to the lateral position is configured so that the host vehicle readily returns to the vicinity of the center of the traveling lane by increasing the steering reaction force as the host vehicle gets farther away from the vicinity of the center of the traveling lane. In other words, the yaw angle integrated value (the lateral position change) is considered to be a disturbance, and the steering reaction force is controlled so that the vehicle is guided in a direction in which the yaw angle integrated value is eliminated. Consequently, resetting the yaw angle integrated value when a lane change has been conducted is necessary. This is because, if the yaw angle integrated value is not reset, the steering reaction force for returning the vehicle to the vicinity of the center of the traveling lane before the lane change will continue to act even after the lane change, and the operation of the driver will be inhibited. If the integrated value is simply set to be zero, guiding the vehicle to the vicinity of the center of the traveling lane after the lane change will not be possible.

Therefore, in the first embodiment, since a deliberate operation of the driver can be considered when the host vehicle reaches the white line, in that case, by switching the lateral position with respect to the left and right white lines at the current position, in other words, by inverting the sign of the yaw angle integrated value, the position to which the host vehicle is guided is switched from the vicinity of the center of the traveling lane before the lane change to the vicinity of the center of the traveling lane after the lane change; therefore, a steering reaction force for guiding the host vehicle to the vicinity of the center of the traveling lane after the lane change can be generated. At this time, in order to consider the ratio $W_2/W_1$ of the lane width $W_2$ of the traveling lane after the lane change with respect to the lane width $W_1$ of the traveling lane before the lane change, setting an accurate lateral position is possible, and setting an optimum offset amount for guiding the host vehicle to the vicinity of the center of the traveling lane is possible.

Effect of the Reaction Force Offset Control Corresponding to the Deviation Margin Time The reaction force offset control corresponding to the deviation margin time adds the reaction force corresponding to the deviation margin time to the steering reaction force torque as the steering reaction force torque offset amount. The steering reaction force characteristic representing the steering reaction force torque corresponding to the self-aligning torque is thereby offset in a direction in which the absolute value of the steering reaction force torque increases as the deviation margin time decreases, as illustrated in FIG. 8. FIG. 8 illustrates a case of being close to the right lane, and in the case of being close to the left lane the offset is in the opposite direction of FIG. 8.

Accordingly, the characteristic representing the relationship between the steering angle and the steering torque is offset in a direction in which the absolute value of the steering torque increases, and characteristic A changes continuously to characteristic C, as the deviation margin time decreases, as illustrated in FIG. 10. At this time, increasing the steering torque in order to maintain the steering angle is necessary; therefore, if the steering torque is constant, the steering wheel 6 gradually returns to the steering angle neutral position (point $P_1 \rightarrow$ point $P_2$), thereby suppressing the traveling position of the vehicle from shifting to the right side due to the driver suddenly steering. On the other hand, when the driver maintains the steering angle, the steering angle and the steering torque move from point $P_1$ to point $P_3$. When the driver conducts corrective steering from this state, since the steering torque neutral position is offset more to the steering increase side than the steering angle neutral position in characteristic C, the sign of the steering torque is not inverted before reaching the steering torque neutral position during the steering increase operation from the steering angle neutral position. Thus, the driver is able to control the turning angle of the front wheels 5L, 5R by only reducing the steering torque and stopping the rotation of the steering wheel 6 when the steering wheel 6 is turned to the target angle. That is, the reaction force offset control corresponding to the deviation margin time of the first embodiment is able to facilitate the corrective steering of the driver since the direction in which the driver controls the force is not readily switched. As a result, the traveling position of the vehicle is not readily overshot, and the corrective steering amount can be reduced.

Additionally, in the reaction force offset control corresponding to the deviation margin time of the first embodiment, the offset amount is configured to increase as the deviation margin time decreases; as a result, the steering torque neutral position is offset to a position that is further separated from the steering angle neutral position as the deviation margin time decreases. When the driver conducts corrective steering for returning the traveling position of the vehicle to the vicinity of the center of the traveling lane, the vehicle is more likely to be closer to the white line as the deviation margin time decreases, and increasing the amount of steering from the steering angle neutral position as the white line becomes closer is necessary. At this time, when the offset amount of the steering torque neutral position with respect to the steering angle neutral position is small, there is the possibility that the steering torque surpasses the neutral position and the sign of the steering torque is inverted before the steering wheel is turned to the target angle. Thus, suppressing the steering torque from surpassing the neutral position is possible by increasing the offset amount as the distance to the white line decreases.

Effect of the Reaction Force Offset Control Corresponding to the Lateral Position and the Deviation Margin Time In the steering reaction force control unit 20, that with the larger absolute value among the reaction force corresponding to the deviation margin time and the reaction force corresponding to the lateral position is selected as the steering reaction force torque offset amount in the steering torque offset unit 36, and the steering reaction force torque offset amount is added to the steering reaction force torque in the adder 20c. The steering reaction force characteristic is thereby offset in a direction in which the absolute value of the steering reaction force torque increases in accordance with the deviation margin time or the lateral position. In the reaction force offset control corresponding to the deviation margin time, the reaction force corresponding to the deviation margin time is zero when the host vehicle and the white line are parallel, that is, when the yaw angle is zero. Consequently, even if the host vehicle is in a position close to the white line, when the yaw angle is small, only a small reaction force can be output. In contrast, in the reaction force offset control corresponding to the lateral position, a reaction force (a reaction force corresponding to the lateral position) is generated to be proportionate to the distance to the white line; therefore, a larger reaction force can be output as the distance to the white line decreases, and readily returning the host vehicle to the vicinity of the center of the traveling lane is possible.

On the other hand, in the reaction force offset control corresponding to the lateral position, when the host vehicle is in the vicinity of the center of the traveling lane the reaction force corresponding to the lateral position is zero. Consequently, even in the vicinity of the center of the traveling lane, when the yaw angle is large and the vehicle speed is high, the white line is reached in a short period of time while increasing the steering reaction force with good responsiveness is difficult. In contrast, in the reaction force offset control corresponding to the deviation margin time, since a reaction force (a reaction force corresponding to the deviation margin time) is generated in accordance with the deviation margin time, and the reaction force has the characteristic of rapidly increasing when the deviation margin time becomes equal to or less than 3 seconds, suppressing lane deviation by increasing the steering reaction force with good responsiveness is possible even when reaching the white line in a short period of time. Thus, by combining the reaction force offset control corresponding to the deviation margin time and the reaction force offset control corresponding to the lateral position, effectively suppressing lane deviation while applying a stable reaction force in accordance with the distance to the white line is possible. At this time, by using that with the larger absolute value from among the reaction force corresponding to the deviation margin time and the reaction force corresponding to the lateral position, always applying the optimum required steering reaction force is possible.

In-Lane Drive Assist Effect

Figure 11:
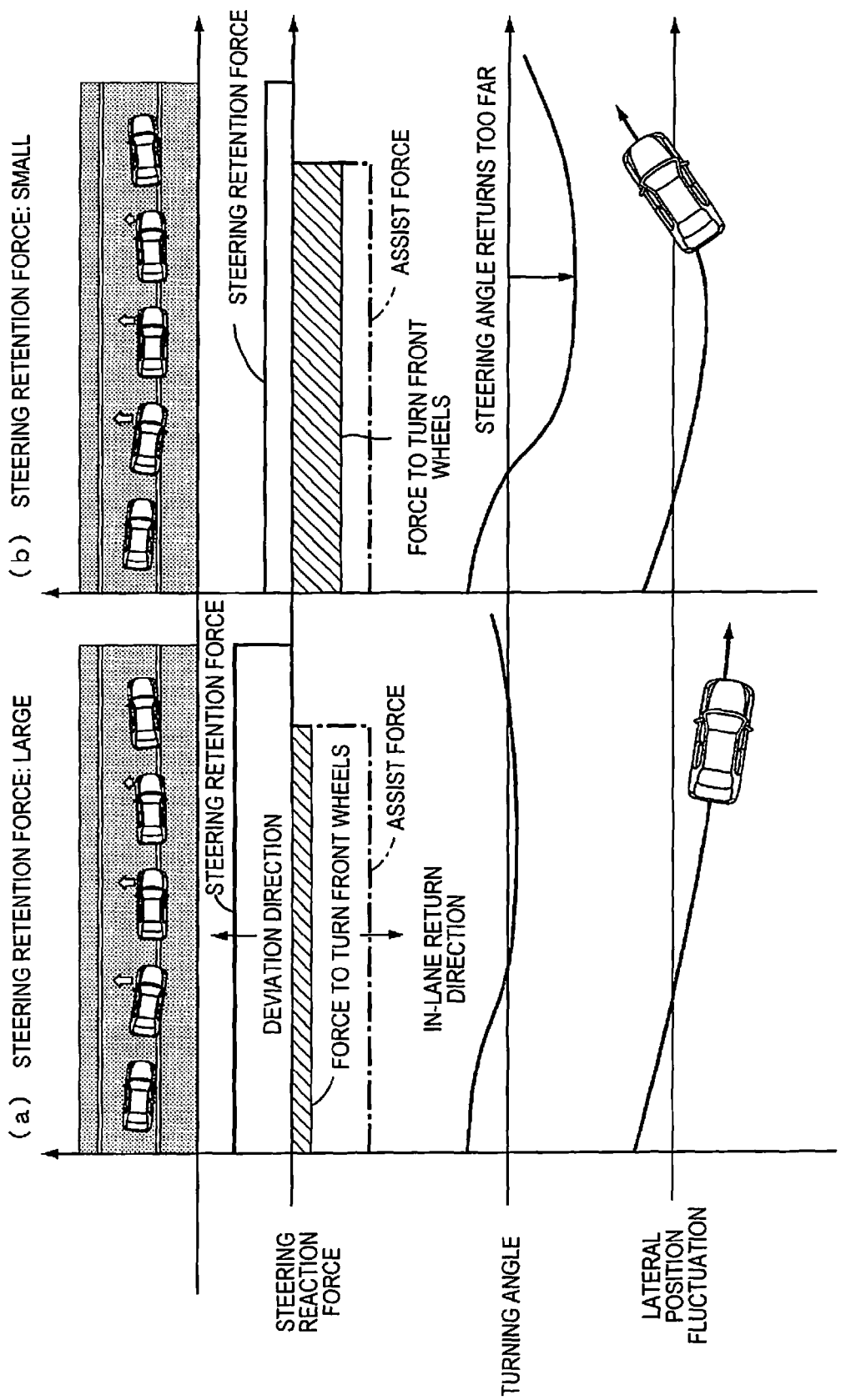
FIG. 11 is a time chart illustrating that variation is generated in the vehicle behavior due to the magnitude of the steering retention force of the driver in a conventional in-lane drive assist device.

In a conventional in-lane drive assist device, when a lane deviation is determined to be present, the driver is urged to perform an operation to return the vehicle into the lane by increasing the assisting force of the electric power steering in a direction to return the vehicle into the traveling lane; however, a turning angle obtained by increasing the assisting force fluctuates due to the steering retention force of the driver, resulting in a variation in the vehicle behavior and not being able to obtain the intended vehicle behavior. For example, when the driver is firmly gripping the steering wheel as in FIG. 11(*a*), the force to overcome the steering retention force of the driver and to turn the front wheels is small; as a result, the turning angle obtained by increasing the assisting force becomes small, and deviation from the lane cannot be prevented. On the other hand, when the driver is lightly gripping the steering wheel as in FIG. 11(*b*), the force to overcome the steering retention force of the driver and to turn the front wheels becomes excessive, and the vehicle will return too far into the lane.

Figure 12:
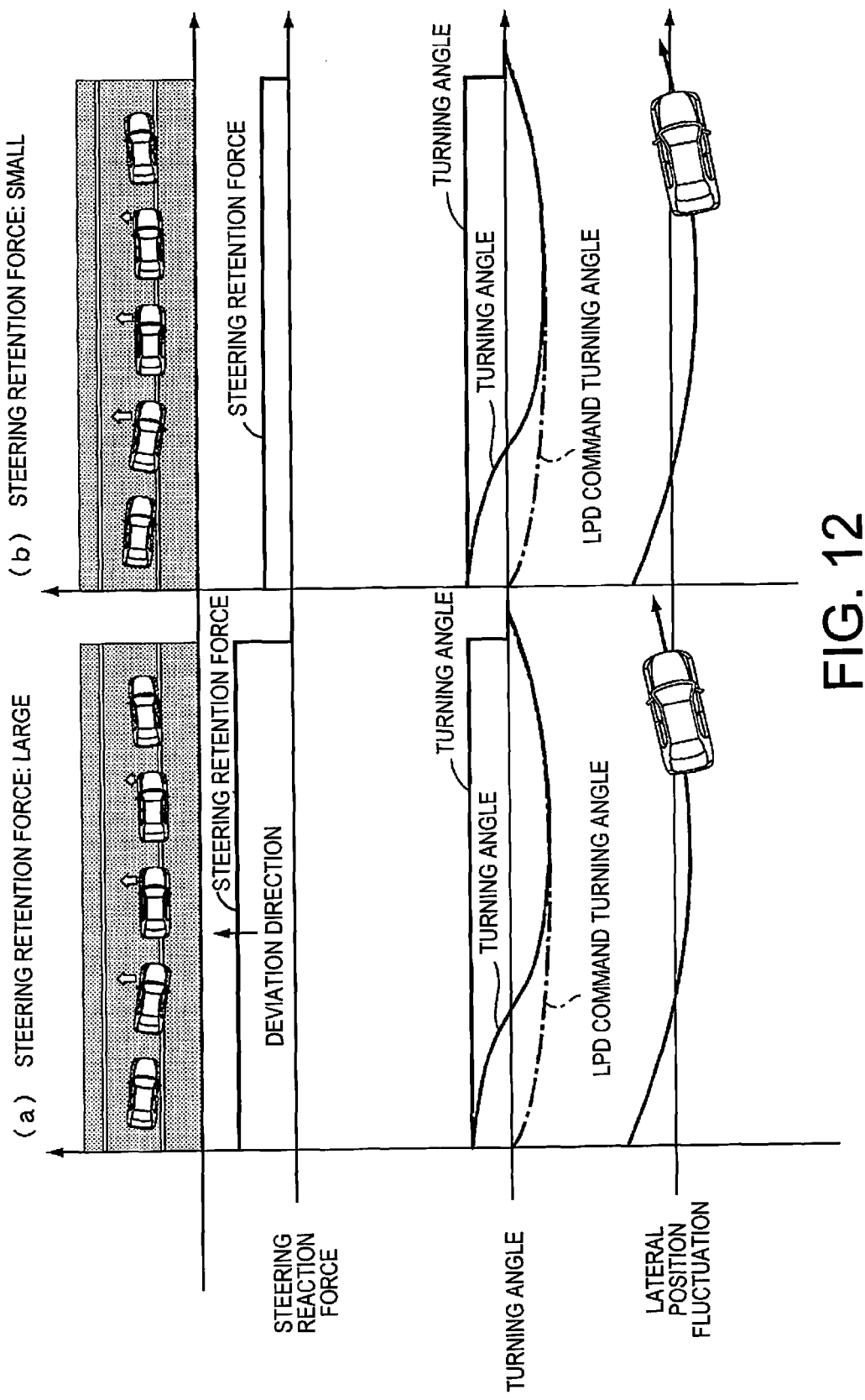
FIG. 12 is a time chart illustrating that the vehicle behavior is identical regardless of the magnitude of the steering retention force of the driver in the in-lane drive assist device of the first embodiment.

In contrast, in the first embodiment, the turning angle is controlled based on the SBW command turning angle based on the steering angle and the vehicle speed when a lane deviation is determined to be absent; when a lane deviation is determined to be present, the turning angle is controlled based on the LDP command turning angle for generating a yaw moment in a direction to return the vehicle into the lane. That is, since a turning angle to return the vehicle into the lane is directly provided to the front wheels 5L, 5R, the actual turning angle can be matched with the LDP command turning angle regardless of the magnitude of the steering retention force of the driver, as illustrated in FIG. 12(*a*), (*b*). In other words, the actual turning angle depends only on the LDP command turning angle and is not affected by the steering retention force of the driver; as a result, the intended vehicle behavior can always be obtained, regardless of the steering retention force of the driver. On the other hand, by applying the steering reaction force corresponding to the tire lateral force inferred from the steering angle and the vehicle speed on the steering reaction force without reflecting the LDP command turning angle, the fluctuation of the tire lateral force that is generated due to applying the LDP command turning angle and switching between the SBW command turning angle and the LDP command turning angle is not reflected on the steering reaction force; as a result, the discomfort imparted to the driver can be reduced.

Figure 13:
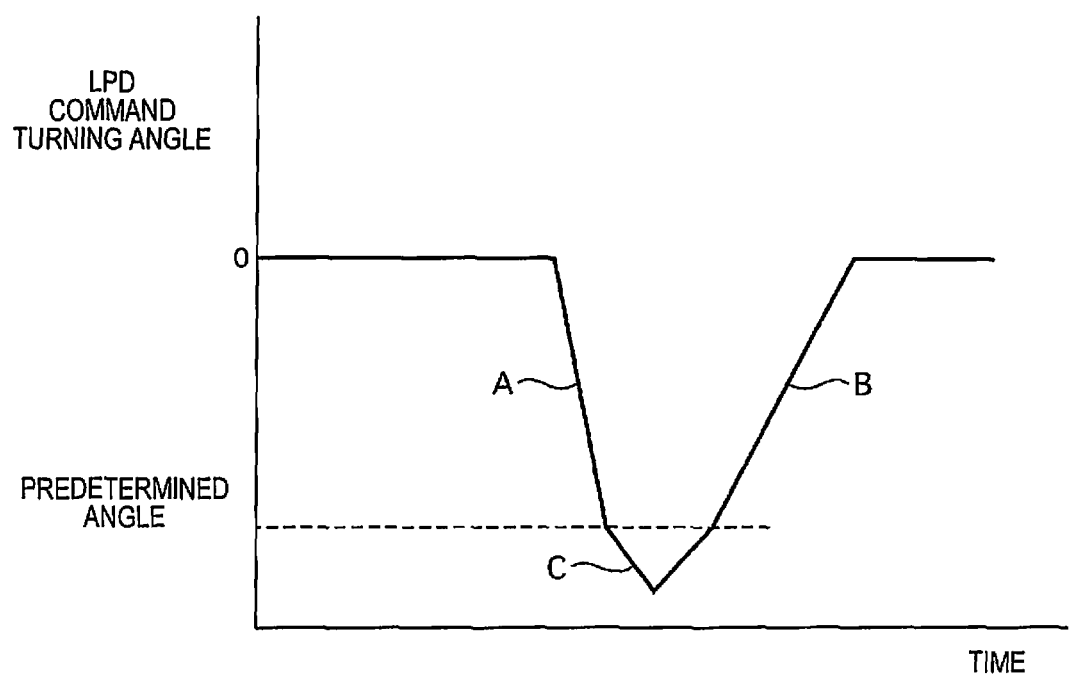
FIG. 13 is a time chart illustrating the LDP command turning angle change in the first embodiment.

FIG. 13 is a time chart illustrating the LDP command turning angle change in the first embodiment, and the limiter processing unit 32*i* increases the rate limit value when the LDP command turning angle is increasing (area A), as compared to when decreasing (area B). When lane deviation is being generated, urging the steering of the driver to avoid a lane deviation by changing the lateral G at an early stage is necessary. On the other hand, after avoiding lane deviation, preventing a rapid change in the vehicle behavior by suppressing a lateral G change as much as possible is necessary. Therefore, by making the increase gradient larger than the decrease gradient of the LDP command turning angle, urging the steering of the driver to avoid a lane deviation earlier is possible, and a rapid change in the vehicle behavior after avoiding lane deviation can be suppressed. Also, even when increasing, the limiter processing unit 32*i* sets the rate limit value smaller when the LDP command turning angle is equal to or greater than a predetermined angle (area C), as compared to when the LDP command turning angle is less than the predetermined angle (area A). If the lateral G change is large at a point at which the increase turns to a decrease (peak point), in an area in which the LDP command turning angle is large, yaw jerk, which causes discomfort to the passenger, becomes large and greatly swings the body and head of the passenger, imparting discomfort. Therefore, the lateral G change at the peak point can be made small by making the increase gradient small when the LDP command turning angle is equal to or greater than a predetermined angle, and the discomfort imparted to the passenger can be reduced by reducing the yaw jerk.

When lane deviation is determined to be present, the limiter processing unit 36*d* maintains the steering reaction force torque offset amount in the reaction force offset control (reaction force offset control corresponding to the lateral position, reaction force offset control corresponding to the deviation margin time) to the value of immediately before the determination. Therefore, since changes in the lateral position and the deviation margin time that occur due to applying the LDP command turning angle are not reflected on the steering reaction force, the discomfort imparted to the driver can be reduced.

The effects listed below can be obtained with the first embodiment, as described above.

(1) Comprises a steering wheel 6 that receives steering input from a driver; a turning unit 2 that turns a front wheels 5L, 5R which is mechanically detached from the steering wheel 6; a deviation determination unit 32*d* that determines the presence/absence of lane deviation with respect to the traveling lane; an LDP command turning angle calculation unit 32 that calculates an LDP command turning angle for generating a yaw moment in a direction to return a vehicle into the lane; a turn control unit 19 that controls the turning angle of the front wheels 5L, 5R based on the SBW command turning angle corresponding to the steering angle when a lane deviation is determined to the absent, and controls the turning angle based on the LDP command turning angle when a lane deviation is determined to be present; and a steering reaction force control unit 20 that controls the steering reaction force based on the steering angle, without reflecting the LDP command turning angle on the steering reaction force that is applied to the steering wheel 6. The intended vehicle behavior can thereby be obtained regardless of the steering retention force of the driver.

(2) Comprises a lateral force calculation unit 33 that calculates the tire lateral force based on the steering angle; an SAT calculation unit 35 that infers the self-aligning torque based on the tire lateral force; a steering reaction force control unit 20 that sets a steering reaction force characteristic to coordinates, of which the coordinate axes are self-aligning torque and steering reaction force, so that the self-aligning torque increases as the steering reaction force increases, and calculates a command steering reaction force torque based on the steering reaction force characteristic; a lateral position calculation unit 36*b* that detects the lateral position of a host vehicle with respect to a white line; and a steering reaction force torque offset unit 36 that offsets the steering reaction force characteristic at the coordinates more in a direction in which the absolute value of the steering reaction force increases as the lateral position of the host vehicle becomes closer to the white line; wherein, the steering reaction force control unit 20 applies the steering reaction force to the steering wheel 6 based on the command steering reaction force torque, and when a lane deviation is determined to be present, the steering reaction force torque offset unit 36 maintains the offset amount of immediately before the determination. Since the steering torque neutral position is thereby offset more to the steering increase side than the steering angle neutral position, the sign of the steering torque being inverted during corrective steering is suppressed. As a result, since the direction in which the driver controls the force is not readily switched, the steering load of the driver can be reduced. Also, since changes in the lateral position and the deviation margin time that occur due to applying the LDP command turning angle are not reflected on the steering reaction force, the discomfort imparted to the driver can be reduced.

(3) Comprises a deviation margin time selection unit 39*d* that calculates the margin time, which is the time required for a host vehicle to reach a white line, wherein the steering reaction force torque offset unit 36 calculates a lateral position offset amount that increases as the detected lateral position becomes closer to the white line, calculates a margin time offset amount that increases as the calculated margin time decreases, and conducts an offset using the larger of the lateral position offset amount and the margin time offset amount. A stable reaction force can thereby be applied in accordance with the distance to the white line while effectively suppressing lane deviation. At this time, by using that with the larger absolute value from among the reaction force corresponding to the deviation margin time and the reaction force corresponding to the lateral position, always applying the optimum required steering reaction force is possible.

(4) Provided with a limiter processing unit 32*i* that limits the LDP command turning angle change, wherein the limiter processing unit 32*i* makes the increase gradient larger than the decrease gradient of the LDP command turning angle. Urging the steering of the driver to avoid a lane deviation earlier is thereby possible, and a rapid change in the vehicle behavior after avoiding lane deviation can be suppressed.

(5) The limiter processing unit 32*i* makes the increase gradient smaller when the LDP command turning angle is equal to or greater than a predetermined angle, as compared to when less than the predetermined angle. Yaw jerk that is generated at a point at which the LDP command turning angle turns from increase to decrease is thereby suppressed, and the discomfort imparted to the passenger can be reduced.

(6) Upon controlling the turning angle of the front wheels 5L, 5R which are mechanically detached from the steering wheel 6, the turning angle of the front wheels 5L, 5R is controlled based on the SBW command turning angle corresponding to the steering angle of the steering wheel 6 when a lane deviation is determined to be absent, and the turning angle is controlled based on an LDP command turning angle for generating a yaw moment in a direction to return the vehicle into the lane while controlling the steering reaction force based on the steering angle without reflecting the LDP command turning angle on the steering reaction force that is applied to the steering wheel 6, when a lane deviation is determined to be present. The intended vehicle behavior can thereby be obtained regardless of the steering retention force of the driver.

(7) Comprises a deviation determination unit 32d that determines the presence/absence of lane deviation with respect to the traveling lane; and an SBW controller 4 that, upon controlling the turning angle of the front wheels 5L, 5R, which are mechanically detached from the steering wheel 6, controls the turning angle of the front wheels 5L, 5R based on the SBW command turning angle corresponding to the steering angle of the steering wheel 6 when a lane deviation is determined to be absent, and controls the turning angle based on an LDP command turning angle for generating a yaw moment in a direction to return the vehicle into the lane while controlling the steering reaction force based on the steering angle without reflecting the LDP command turning angle on the steering reaction force that is applied to the steering wheel 6, when a lane deviation is determined to be present. The intended vehicle behavior can thereby be obtained regardless of the steering retention force of the driver.

Second Embodiment

Figure 14:
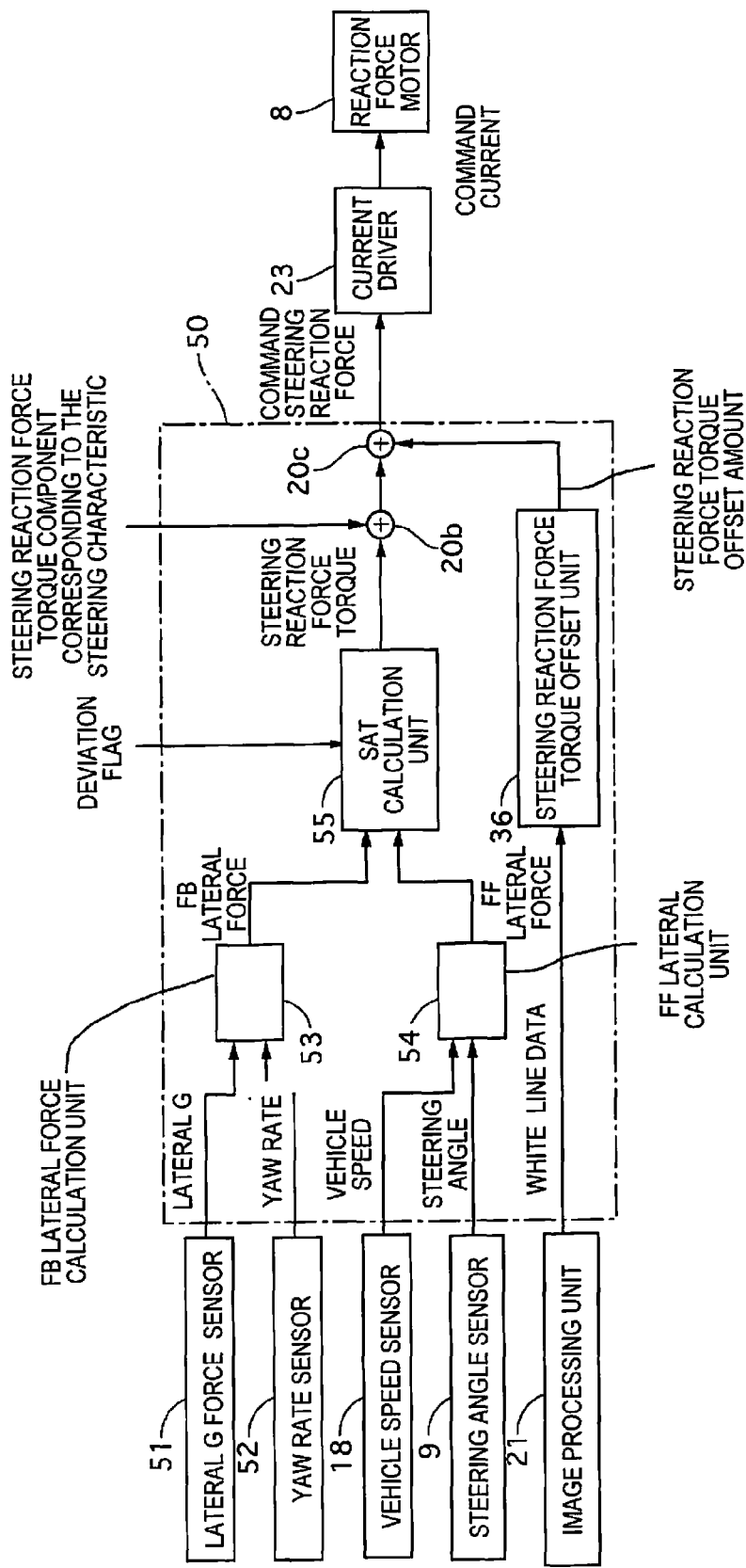
FIG. 14 is a control block view of a steering reaction force control unit 50 of the second embodiment.

The steering device of the second embodiment is different from the first embodiment in the configuration of the steering reaction force control unit. FIG. 14 is a control block view of a steering reaction force control unit 50 of the second embodiment. Only the locations that differ from the first embodiment in FIG. 3 will be described. The lateral G sensor 51 detects the lateral acceleration (lateral G) of the vehicle. The yaw rate sensor 52 detects the yaw rate of the vehicle. The FB lateral force calculation unit 53 calculates a feedback (FB) tire lateral force based on the lateral G and the yaw rate, using a known two-wheel model.

The FF lateral force calculation unit 54 calculates a feed-forward (FF) tire lateral force by referencing a steering angle-lateral force conversion map representing the relationship between the steering angle and the tire lateral force per vehicle speed in a conventional steering device, which have been obtained by experimentation or other means beforehand, based on the steering angle and the vehicle speed. The steering angle-lateral force conversion map has a characteristic in which the tire lateral force increases as the steering angle increases; the change amount of the tire lateral force with respect to the change amount of the steering angle is larger when the steering angle is small, as compared to when large; and the tire lateral force becomes smaller as the vehicle speed increases.

The SAT calculation unit 55 imparts a weighting to the FB tire lateral force and the FF tire lateral force, giving consideration to the vehicle speed and the absolute value of the difference between the two lateral forces (lateral force difference) to obtain a final tire lateral force, and calculates a steering reaction force torque that is generated by the tire lateral force by referencing a lateral force-steering reaction force torque conversion map, representing the relationship between the tire lateral force and the steering reaction force torque in a conventional steering device obtained by experimentation or other means beforehand, based on the vehicle speed and the tire lateral force. The tire lateral force-steering reaction force torque conversion map is the same as that in the first embodiment.

The SAT calculation unit 55 decreases a distribution ratio Gv corresponding to the vehicle speed of the FF tire lateral force and increases the distribution ratio 1-Gv corresponding to the vehicle speed of the FB tire lateral force as the vehicle speed decreases, when the vehicle speed is less than a predetermined vehicle speed threshold value (for example 30 km/h). Here, the vehicle speed threshold value is a vehicle speed at which nonlinearity of the tire characteristic appears, and the inference accuracy of the FF tire lateral force begins to decline. On the other hand, when the vehicle speed exceeds the predetermined value, the distribution ratios Gv, 1-Gv corresponding to the vehicle speeds of the FF tire lateral force and the FB tire lateral force are both set to 0.5.

The SAT calculation unit 55 sets a distribution ratio Gf corresponding to the lateral force difference of the FF tire lateral force to 1, and a distribution ratio 1-Gf corresponding to the lateral force difference of the FB tire lateral force to zero, when the lateral force difference is less than a predetermined first lateral force difference threshold value. Here, the first lateral force difference threshold value is a lateral force at which the inference accuracy of the FF tire lateral force begins to decline. Also, when the lateral force exceeds a predetermined second lateral force difference, the distribution ratio Gf corresponding to the lateral force difference of the FF tire lateral force is set to zero, and the distribution ratio 1-Gf corresponding to the lateral force difference of the FB tire lateral force is set to 1. Here, the second lateral force difference threshold value is a lateral force at which the inference accuracy of the FF tire lateral force declines more than the inference accuracy of the FB tire lateral force. Additionally, when the lateral force difference threshold value is equal to or greater than the first lateral force difference threshold value and equal to or less than the second lateral force difference threshold value, the distribution ratio Gf corresponding to the lateral force difference of the FF tire lateral force is decreased and the distribution ratio 1-Gf corresponding to the lateral force difference of the FB tire lateral force is increased, as the lateral force difference increases. The SAT calculation unit 55 obtains a gain k by multiplying the distribution ratio Gf corresponding to the lateral force difference and the distribution ratio GV corresponding to the vehicle speed, and obtains a final tire lateral force by adding a value obtained by multiplying the gain (1-k) and the FB tire lateral force, and a value obtained by multiplying the gain k and the FF tire lateral force. When a deviation flag outputted from the deviation determination unit 32d is set, the SAT calculation unit 55 sets the gain k to 1 and the gain (1-k) to zero until the deviation flag is reset.

Next, the effects are described.

Tire Lateral Force Calculation Effect by the FF Tire Lateral Force and the FB Tire Lateral Force In the second embodiment, the FF tire lateral force is inferred from the vehicle speed and the steering angle, and the FB tire lateral force is inferred from the yaw rate and the lateral G, which is a turning state quantity, in the SAT calculation unit 55 of the steering reaction force control unit 50. Then, weighting is imparted to the FF tire lateral force and the FB tire lateral force according to the vehicle speed and the lateral force difference to obtain a final tire lateral force. The FB tire lateral force changes in accordance with changes in the road surface state or changes in the vehicle state. On the other hand, the FF tire lateral force changes smoothly regardless of changes in the road surface state or the like. Consequently, the inference accuracy of the FF tire lateral force declines when less than a vehicle speed threshold value at which nonlinearity of the tire characteristic appears. In contrast, the inference accuracy of the FB tire lateral force is nearly constant regardless of the vehicle speed.

Therefore, in the second embodiment, the gain k that is multiplied to the FF tire lateral force is decreased while increasing the gain (1-k) that is multiplied to the FB tire lateral force as the vehicle speed decreases, when the vehicle speed is less than the vehicle speed threshold value. The decline in the inference accuracy of the tire lateral force in a low vehicle speed range can thereby be suppressed, and a more appropriate steering reaction force can be applied. Also, in the second embodiment, the gain k that is multiplied to the FF tire lateral force is decreased while increasing the gain (1-k) that is multiplied to the FB tire lateral force as the lateral force difference increases, when the lateral force difference is equal to or greater than the first lateral force difference threshold value. The decline in the inference accuracy of the final tire lateral force can thereby be suppressed with respect to the decline in the inference accuracy of the FF tire lateral force, and a more appropriate steering reaction force can be applied.

In-Lane Drive Assist Effect

In the second embodiment, when a lane deviation is determined to be present, the command steering reaction force torque is calculated based only on the FF tire lateral force, in the SAT calculation unit 55. Therefore, since changes in the lateral G and the yaw rate that occur due to applying the LDP command turning angle are not reflected on the steering reaction force, the discomfort imparted to the driver can be reduced.

The effects listed below, in addition to effects (3)-(5) of the first embodiment, can be obtained with the second embodiment, as described above.

(8) Comprises a steering wheel 6 that receives steering input from a driver; a turning unit 2 that turns a front wheels 5L, 5R which is mechanically detached from the steering wheel 6; a lateral G sensor 51 that detects the lateral G of a vehicle; a yaw rate sensor 52 that detects the yaw rate of the vehicle; a deviation determination unit 32d that determines the presence/absence of lane deviation with respect to the traveling lane; an LDP command turning angle calculation unit 32 that calculates an LDP command turning angle for generating a yaw moment in a direction to return a vehicle into the lane; a turn control unit 19 that controls the turning angle of the front wheels 5L, 5R based on the SBW command turning angle corresponding to the steering angle when a lane deviation is determined to the absent, and controls the turning angle based on the LDP command turning angle when a lane deviation is determined to be present; and a steering reaction force control unit 50 that controls the steering reaction force that is applied to the steering wheel 6 based on at least one of the FF tire lateral force corresponding to the steering angle and the FB tire lateral force corresponding to the lateral G and the yaw rate, when a lane deviation is determined to be absent, and controls the steering reaction force based on the FF tire lateral force without reflecting the FB tire lateral force on the steering reaction force that is applied to the steering wheel 6, when a lane deviation is determined to be present. The intended vehicle behavior can thereby be obtained regardless of the steering retention force of the driver. Also, since changes in the lateral G and the yaw rate that occur due to applying the LDP command turning angle are not reflected on the steering reaction force, the discomfort imparted to the driver can be reduced.

(9) Comprises an FF tire lateral force calculation unit 54 that calculates the FF tire lateral force based on the steering angle; an FB tire lateral force calculation unit 53 that calculates the FB tire lateral force based on the lateral G and the yaw rate; an SAT calculation unit 55 that infers the self-aligning torque based on at least one of the FF tire lateral force and the FB tire lateral force; a steering reaction force control unit 20 that sets a steering reaction force characteristic to coordinates, of which the coordinate axes are self-aligning torque and steering reaction force, so that the self-aligning torque increases as the steering reaction force increases, and calculates a command steering reaction force torque based on the steering reaction force characteristic; a lateral position calculation unit 36b that detects the lateral position of a host vehicle with respect to a white line; and a steering reaction force torque offset unit 36 that offsets the steering reaction force characteristic at the coordinates more in a direction in which the absolute value of the steering reaction force increases as the lateral position of the host vehicle becomes closer to the white line; wherein, the steering reaction force control unit 20 applies the steering reaction force to the steering wheel 6 based on the command steering reaction force torque, and when a lane deviation is determined to be present, the steering reaction force torque offset unit 36 maintains the offset amount of immediately before the determination. Since the steering torque neutral position is thereby offset more to the steering increase side than the steering angle neutral position, the sign of the steering torque being inverted during corrective steering is suppressed. As a result, since the direction in which the driver controls the force is not readily switched, the steering load of the driver can be reduced. Also, since changes in the lateral position and the deviation margin time that occur due to applying the LDP command turning angle are not reflected on the steering reaction force, the discomfort imparted to the driver can be reduced.

Other Embodiments

A preferred embodiment of the present invention was described above based on one embodiment, but specific configurations of the present invention are not limited by the embodiment, and changes to the design made without departing from the scope of the invention are also included in the present invention.

The invention claimed is:
1. An in-lane drive assist device comprising:
a steering unit that is configured to be steered by a driver;
a turning unit configured to turn a turning wheel that is mechanically detached from the steering unit;
a lane deviation determination unit programmed to determine the presence/absence of lane deviation with respect to a traveling lane;
a drive assist turning amount calculation unit programmed to calculate a drive assist turning amount for generating a yaw moment in a direction to return a host vehicle into the traveling lane, when a lane deviation is determined to be present;
a turn control unit programmed to control a turning amount of the turning unit based on a steering amount of the steering unit when a lane deviation is determined to be absent, and programmed to control the turning amount based on a drive assist turning amount when a lane deviation is determined to be present;

a self-aligning torque inferring unit programmed to infer a self-aligning torque based on the steering amount;

a target steering reaction force calculation unit programmed to calculate a target steering reaction force based on a steering reaction force characteristic that is set so that the self-aligning torque increases as the steering reaction force increases;

a steering reaction force control unit programmed to control the steering reaction force based on the target steering reaction force;

a lateral position detection unit programmed to determine a lateral position of the host vehicle with respect to a white line of a road surface; and an offset unit programmed to offset the steering reaction force characteristic in a direction that increases a steering reaction force curve with respect to the self-aligning torque in the steering reaction force characteristic such that a value of the steering reaction force is increased as the lateral position becomes closer to the white line.

2. The in-lane drive assist device according to claim 1, wherein
the offset unit is further programmed to maintain an offset amount of immediately before the determination, when a lane deviation is determined to be present.

3. The in-lane drive assist device according to claim 2, further comprising:
a margin time calculation unit programmed to calculate a margin time, which is a time required for the host vehicle to reach the white line,
the offset unit being programmed to calculate a lateral position offset amount that increases as the detected lateral position becomes closer to the white line, programmed to calculate a margin time offset amount that increases as the calculated margin time decreases, and programmed to conduct the offset using a larger of the lateral position offset amount and the margin time offset amount.

4. The in-lane drive assist device according to claim 1, further comprising:
a change limiting unit programmed to limiting a change in the drive assist turning amount,
the change limiting unit being programmed to make an increase gradient larger than a decrease gradient of the drive assist turning amount.

5. The in-lane drive assist device according to claim 4, wherein
the change limiting unit is programmed to make the increase gradient smaller when the drive assist turning amount is equal to or greater than a predetermined amount, as compared to when less than the predetermined amount.

6. An in-lane drive assist device comprising:
a steering unit that is configured to be steered by a driver;
a turning unit configured to turn a turning wheel that is mechanically detached from the steering unit;
a turning state quantity detection unit programmed to determine a turning state quantity of a host vehicle;
a lane deviation determination unit programmed to determine a presence/absence of lane deviation with respect to a traveling lane;
a drive assist turning amount calculation unit programmed to calculate a drive assist turning amount for generating a yaw moment in a direction to return the host vehicle into the traveling lane, when a lane deviation is determined to be present;

a turn control unit programmed to control a turning amount of the turning unit based on a steering amount of the steering unit when a lane deviation is determined to be absent, and controlling the turning amount based on a drive assist turning amount when a lane deviation is determined to be present;

a self-aligning torque inferring unit programmed to infer a self-aligning torque based on at least one of the steering amount and the turning state quantity;

a target steering reaction force calculation unit programmed to calculate a target steering reaction force based on a steering reaction force characteristic that is set so that the self-aligning torque increases as the steering reaction force increases;

a steering reaction force control unit programmed to control the steering reaction force target steering reaction force;

a lateral position detection unit programmed to determine a lateral position of the host vehicle with respect to a white line of a road surface; and an offset unit programmed to offset the steering reaction force characteristic in a direction that increases a steering reaction force curve with respect to the self-aligning torque in the steering reaction force characteristic such that a value of the steering reaction force is increased as the lateral position becomes closer to the white line.

7. The in-lane drive assist device according to claim 6, further comprising:
a change limiting unit programmed to limiting a change in the drive assist turning amount, the change limiting unit being programmed to make an increase gradient larger than a decrease gradient of the drive assist turning amount.

8. The in-lane drive assist device according to claim 7, wherein
the change limiting unit is programmed to make the increase gradient smaller when the drive assist turning amount is equal to or greater than a predetermined amount, as compared to when less than the predetermined amount.

9. An in-lane drive assist device comprising:
a controller programmed to
control a turning amount of a turning unit that is mechanically detached from a steering unit based on a steering amount of a steering unit when a lane deviation is determined to be absent, and
control the turning amount based on a drive assist turning amount for generating a yaw moment in a direction to return a host vehicle into a lane while the steering reaction force that is applied to the steering unit is controlled based on a target steering reaction force corresponding to a steering reaction force characteristic that is set so that a self-aligning torque increases as the steering reaction force increases when a lane deviation is determined to be present, and the steering reaction force characteristic is offset in a direction that increases a steering reaction force curve with respect to the self-aligning torque in the steering reaction force characteristic such that a value of the steering reaction force increases as a lateral position of the host vehicle with respect to a white line of a road surface becomes closer to the white line.

10. An in-lane drive assist device comprising:
a sensor for determining a presence/absence of lane deviation with respect to a traveling lane; and
a controller programmed to control a turning amount of a turning unit that is mechanically detached from a steering unit based on a steering amount of the steering unit when a lane deviation is determined to be absent, and the controller being programmed to control the turning amount based on a drive assist turning amount for generating a yaw moment in a direction to return a vehicle into a lane while controlling a steering reaction force that is applied to the steering unit based on a target steering reaction force corresponding to a steering reaction force characteristic that is set so that a self-aligning torque increases as the steering reaction force increases when the lane deviation is determined to be present, and the controller being programmed to offset the steering reaction force characteristic in a direction that increases a steering reaction force curve with respect to the self-aligning torque in the steering reaction force characteristic such that a value of the steering reaction force increases as a lateral position of the vehicle becomes closer to a white line of a road surface.

* * * * *